(12) United States Patent
Tsukamoto

(10) Patent No.: US 10,253,205 B2
(45) Date of Patent: Apr. 9, 2019

(54) AQUEOUS COMPOSITION FOR FORMING A HARDCOAT LAYER AND HARDCOAT LAYER

(71) Applicant: FUJIFILM Corporation, Minato-ku, Tokyo (JP)

(72) Inventor: Naoki Tsukamoto, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 545 days.

(21) Appl. No.: 14/869,206

(22) Filed: Sep. 29, 2015

(65) Prior Publication Data

US 2016/0017173 A1  Jan. 21, 2016

Related U.S. Application Data

(63) Continuation of application No. PCT/JP2014/058767, filed on Mar. 27, 2014.

(30) Foreign Application Priority Data

Mar. 29, 2013 (JP) .................................. 2013-073028
Aug. 2, 2013 (JP) .................................. 2013-161702

(51) Int. Cl.
| | | |
|---|---|---|
| *C09D 163/00* | (2006.01) | |
| *C09D 183/00* | (2006.01) | |
| *C08L 83/06* | (2006.01) | |
| *C08J 7/04* | (2006.01) | |
| *G06F 3/00* | (2006.01) | |

(Continued)

(52) U.S. Cl.
CPC ............ *C09D 163/00* (2013.01); *B32B 27/06* (2013.01); *B32B 27/36* (2013.01); *C08J 7/04* (2013.01); *C08L 83/06* (2013.01); *C09D 7/61* (2018.01); *C09D 183/06* (2013.01); *G06F 3/00* (2013.01); *B32B 2255/10* (2013.01); *B32B 2255/26* (2013.01); *B32B 2307/418* (2013.01);

(Continued)

(58) Field of Classification Search
CPC ...... C09D 163/00; C09D 183/00; C09D 7/61; C08L 83/06; C08J 7/04; G06F 3/00; B32B 27/06; B32B 27/36; B32B 2255/10; B32B 2255/26; B32B 2307/418; B32B 2457/208; C08G 77/14; C08K 3/22
USPC ........................................................ 523/425
See application file for complete search history.

(56) References Cited

U.S. PATENT DOCUMENTS

2012/0034449 A1* 2/2012 Imamura ............... C08J 7/04
428/331

FOREIGN PATENT DOCUMENTS

JP 11-302597 A 11/1999
JP 2002-069376 A 3/2002
(Continued)

OTHER PUBLICATIONS

International Search Report for PCT/JP2014/058767 dated Jul. 15, 2014 [PCT/ISA/210].

(Continued)

*Primary Examiner* — David T Karst
(74) *Attorney, Agent, or Firm* — Sughrue Mion, PLLC

(57) ABSTRACT

A high-refractive-index hardcoat layer of a sufficiently reduced haze value can be obtained from an aqueous composition containing Si, Al and at least one of Ti and Zr, in which the ratio of the number of atoms of Ti and Zr with respect to the number of atoms of Si is 2.5 to 18, the ratio of the number of atoms of Al with respect to the number of atoms of Si is 0.08 to 0.22, and the aqueous composition has a haze value of 0.5% or less.

17 Claims, 1 Drawing Sheet

(51) Int. Cl.
- *B32B 27/06* (2006.01)
- *B32B 27/36* (2006.01)
- *C09D 7/61* (2018.01)
- *C08G 77/14* (2006.01)
- *C08K 3/22* (2006.01)
- *C09D 183/06* (2006.01)

(52) U.S. Cl.
CPC ........ *B32B 2457/208* (2013.01); *C08G 77/14* (2013.01); *C08K 3/22* (2013.01)

(56) References Cited

FOREIGN PATENT DOCUMENTS

| | | |
|---|---|---|
| JP | 2010-188604 A | 9/2010 |
| WO | 2010/095729 A1 | 8/2010 |
| WO | 2014/073312 A1 | 5/2014 |

OTHER PUBLICATIONS

Written Opinion for PCT/JP2014/058767 dated Jul. 15, 2014 [PCT/ISA/237].
Office Action dated Feb. 28, 2017, issued by the Japan Patent Office in corresponding Japanese Application No. 2013-161702.
Office Action dated Dec. 13, 2016, issued by the State Intellectual Property Office of the P.R.C. in corresponding Chinese Application No. 201480018823.5.
Office Action dated Jul. 5, 2016, issued by the Japan Patent Office in corresponding Japanese Application No. 2013-161702.
International Preliminary Report on Patentability (IPRP) dated Oct. 8, 2015 by the International Bureau in International Application No. PCT/JP2014/058767.

\* cited by examiner

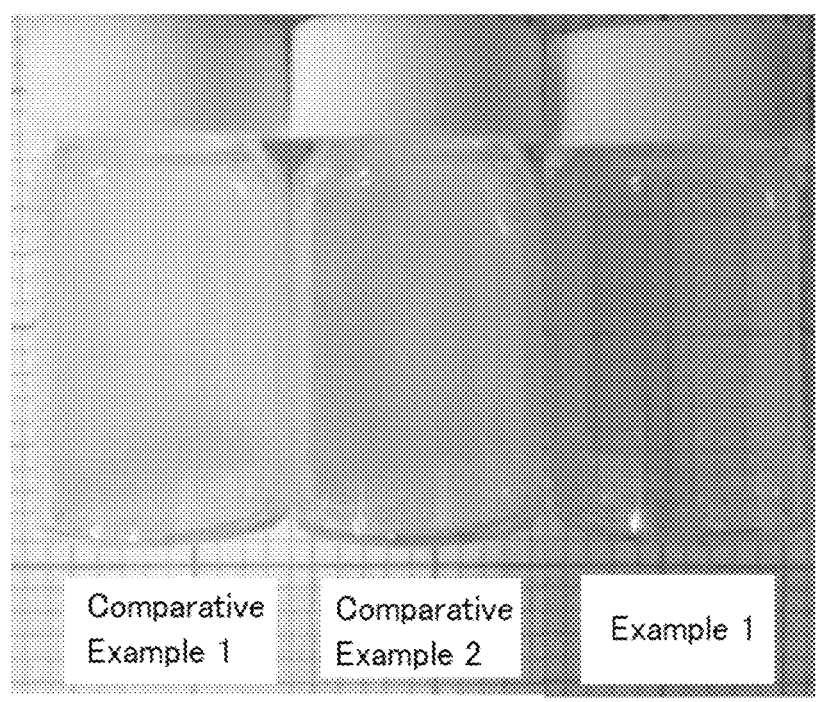

AQUEOUS COMPOSITION FOR FORMING A HARDCOAT LAYER AND HARDCOAT LAYER

CROSS-REFERENCE TO RELATED APPLICATIONS

This application is a Continuation of PCT International Application No. PCT/JP2014/058767, filed on Mar. 27, 2014, which claims priority under 35 U.S.C. Section 119 (a) to Japanese Patent Application No. 2013-073028 filed on Mar. 29, 2013, and Japanese Patent Application No. 2013-161702 filed on Aug. 2, 2013. Each of the above applications is hereby expressly incorporated by reference, in its entirety, into the present application.

BACKGROUND OF THE INVENTION

Field of the Invention

The present invention relates to an aqueous composition for forming a hardcoat layer, and to hardcoat layers. Specifically, the present invention relates to an aqueous composition having a haze value of not greater than a certain value for use in forming a hardcoat layer. The present invention also relates to hardcoat layers formed of such aqueous compositions.

Background Art

There has been rapid expansion of display devices such as liquid crystal displays, plasma displays, and touch panel displays. The surfaces of components in these display devices are prone to scratch as they become contact with various objects during production. Scratches are not only detrimental to transmittance but the mere appearance becomes a problem in the components of the display device. The display surface thus requires high scratch resistance and impact resistance.

The scratch resistance and impact resistance of a display component surface are often improved by providing a hardcoat layer on the display surface. The hardcoat layer is formed by ultraviolet or electron beam irradiation and curing of materials containing multifunctional acryl polymerizable monomers or oligomers, or by condensation and curing of alkoxysilane hydrolysates.

For example, Patent Document 1 and Patent Document 2 disclose hardcoat compositions containing a functional group-containing alkoxysilane, inorganic fine particles, and a curing promoting agent. These publications propose to improve scratch resistance and impact resistance by adjusting the components and other parameters of the hardcoat composition. Patent Document 1 uses organic solvents to form hardcoat compositions. Patent Document 2 uses silica fine particles as inorganic fine particles.

CITATION LIST

Patent Documents

Patent Document 1: JP-A-11-302597
Patent Document 2: JP-A-2010-188604

SUMMARY OF INVENTION

The hardcoat layer compositions of Patent Document 1 use organic solvents, and are not environmentally friendly. Another problem is that the vaporization of the organic solvent in manufacture is harmful to the production environment.

The inorganic fine particles used in the hardcoat layer of Patent Document 2 are silica fine particles, and a hardcoat layer of sufficiently high refractive index cannot be produced. When such a low-refractive-index hardcoat layer is used to make a laminated film for touch panel applications by laminating an ITO conductive film, problems occur due to a large refractive index difference between the layers. A phenomenon called "visible patterns" is one example of such problems.

A hardcoat layer with high production adaptivity and high refractive index can be formed by using an aqueous composition containing high-refractive-index inorganic fine particles such as zirconia and titania. However, studies by the present inventor revealed that the haze value increases, and a hardcoat layer of high transparency cannot be formed when high-refractive-index inorganic fine particles such as zirconia and titania are added to an alkoxysilane derivative-containing aqueous composition in the presence of a curing promoting agent.

Another problem is that, when a high-refractive-index and low-haze hardcoat layer is used for a laminated film for touch panel applications, the hardcoat layer becomes dissolved by the alkaline solution used to laminate an ITO conductive film, and the haze value increases. There accordingly is a need to improve the alkali resistance of the hardcoat layer.

With the intention of providing a solution to the problems of related art, the present inventor conducted studies to provide a low-haze aqueous composition for forming a high-refractive-index hardcoat layer. The present inventor also conducted studies to produce a high-refractive-index and low-haze hardcoat layer having alkali resistance.

After intensive studies directed to solving the foregoing problems, the present inventor found a novel innovative technique to prepare such aqueous compositions. The present invention was completed on the basis of the finding that the aqueous compositions prepared by using the novel technique can be used to form a high-refractive-index and low-haze hardcoat layer. The present inventors also found that the hardcoat layer has excellent alkali resistance.

Specifically, the present invention has the following configurations.

[1] An aqueous composition comprising metallic elements that include at least one of Ti and Zr, and Si and Al, the ratio of the number of atoms of Ti and Zr with respect to the number of atoms of Si that is (Ti+Zr)/Si being 2.5 to 18, the ratio of the number of atoms of Al with respect to the number of atoms of Si that is Al/Si being 0.08 to 0.22, and the aqueous composition having a haze value of 0.5% or less.

[2] The aqueous composition according to [1], wherein the aqueous composition is a mixture of an epoxy-containing alkoxysilane, an epoxy-free alkoxysilane, inorganic fine particles, and a curing promoting agent, the inorganic fine particles having a refractive index of 2.0 or more, and the curing promoting agent being contained in a proportion of 30 mass % or more with respect to the total mass of the epoxy-containing alkoxysilane and the epoxy-free alkoxysilane.

[3] The aqueous composition according to [2], wherein the inorganic fine particles have an average particle size of 30 nm or less in the aqueous composition.

[4] The aqueous composition according to [2] or [3], wherein the inorganic fine particles are fine particles of zirconia or titania.

[5] The aqueous composition according to any one of [2] to [4], wherein the curing promoting agent is an aluminum chelate complex.

[6] The aqueous composition according to any one of [2] to [5], wherein the proportion of the epoxy-containing alkoxysilane is 20 to 85 mass % with respect to the total mass of the epoxy-containing alkoxysilane and the epoxy-free alkoxysilane.

[7] The aqueous composition according to any one of [2] to [6], wherein the epoxy-free alkoxysilane includes at least one of tetraalkoxysilane and trialkoxysilane.

[8] The aqueous composition according to any one of [2] to [7], wherein the epoxy-free alkoxysilane includes at least one of tetraethoxysilane, tetramethoxysilane, methyltriethoxysilane, and methyltrimethoxysilane.

[9] A method for producing an aqueous composition, the method comprising:
obtaining a first aqueous composition that contains an epoxy-containing alkoxysilane, an epoxy-free alkoxysilane, and inorganic fine particles;
obtaining a second aqueous composition that contains an epoxy-containing alkoxysilane, an epoxy-free alkoxysilane, and a curing promoting agent; and
mixing the first aqueous composition and the second aqueous composition.

[10] The method according to [9], wherein the mass ratio of the first aqueous composition and the second aqueous composition is 3:7 to 9:1.

[11] The method according to [9] or [10], wherein the inorganic fine particles have an average particle size of 30 nm or less in the aqueous composition.

[12] The method according to any one of [9] to [11], wherein the aqueous composition comprises metallic elements that include at least one of Ti and Zr, and Si and Al, the ratio of the number of atoms of Ti and Zr with respect to the number of atoms of Si that is (Ti+Zr)/Si being 2.5 to 18, the ratio of the number of atoms of Al with respect to the number of atoms of Si that is Al/Si being 0.08 to 0.22.

[13] An aqueous composition produced by using the method of any one of [9] to [12].

[14] A hardcoat layer formed by curing the aqueous composition of any one of [1] to [8], and [13].

[15] The hardcoat layer according to [14], wherein the hardcoat layer has a refractive index of 1.6 or more.

[16] The hardcoat layer according to [14] or [16], wherein the hardcoat layer has a haze value of 0.5% or less.

[17] A laminated film comprising the hardcoat layer of any one of [14] to [16] on at least one surface of a polyester film.

[18] A laminated film comprising an easily bondable layer, an optical modulation layer, and the hardcoat layer of any one of [14] to [16], in this order on a polyester film.

[19] The laminated film according to [18], wherein the easily bondable layer and the polyester film have a refractive index difference of 0.03 or less, the optical modulation layer has a refractive index of 1.75 to 1.90, and the hardcoat layer has a refractive index of 1.90 to 2.10.

[20] A touch panel comprising the laminated film of any one of [17] to [19], and a transparent electrode layer.

With the aqueous composition of the present invention, a high-refractive-index hardcoat layer of a sufficiently reduced haze value can be obtained. Specifically, the present invention can reduce the haze value of a hardcoat layer even in a case of containing high-refractive-index inorganic fine particles.

The aqueous composition of the present invention also can be used to provide a hardcoat layer having strong alkali resistance. The invention can thus prevent the hardcoat layer from being dissolved by an alkaline solution when laminating a transparent electrode layer on the hardcoat layer, and can reduce an increase of haze value.

BRIEF DESCRIPTION OF DRAWING

The patent or application file contains at least one drawing executed in color. Copies of this patent or patent application publication with color drawing(s) will be provided by the Office upon request and payment of the necessary fee.

FIG. 1 shows photographs representing suspended states of aqueous compositions.

DESCRIPTION OF EMBODIMENTS

The present invention is described below in detail. The descriptions of the constituting elements below, including the representative embodiments and concrete examples thereof according to the present invention, serve solely to illustrate the present invention, and the present invention is not limited by such embodiments. As used herein, numerical ranges with the preposition "to" are intended to be inclusive of the numbers defining the lower and upper limits of the ranges.

(Aqueous Composition)

The aqueous composition of the present invention contains alkoxysilane derivatives. The alkoxysilanes include epoxy-containing alkoxysilanes and epoxy-free alkoxysilanes.

The alkoxysilanes preferably use water-soluble or water-dispersive materials. Using water-soluble or water-dispersive materials are particularly preferred from the viewpoint of reducing environmental contamination due to VOCs (volatile organic compounds).

The epoxy-containing alkoxysilanes and the epoxy-free alkoxysilanes have a hydrolyzable group. The hydrolyzable group is hydrolyzed in an acidic aqueous solution to yield silanol, which then condenses to yield an oligomer. In the aqueous composition of the present invention, the epoxy-containing alkoxysilane and the epoxy-free alkoxysilane may be partially hydrolyzed. The term "alkoxysilane derivatives" as used herein collectively refers to partially or entirely hydrolyzed or condensed alkoxysilanes.

The aqueous composition of the present invention is an aqueous composition that contains metallic elements including at least one of Ti and Zr, and Si and Al. In the aqueous composition, the ratio of the number of atoms of Ti and Zr with respect to the number of atoms of Si ((Ti+Zr)/Si) is 2.5 to 18, and the ratio of the number of atoms of Al with respect to the number of atoms of Si (Al/Si) is 0.08 to 0.22. The aqueous composition has a haze value of 0.5% or less.

The aqueous composition is applied onto a support, and cured to form a hardcoat layer. Specifically, the aqueous composition of the present invention can be used to form a hardcoat layer.

The aqueous composition of the present invention does not use an organic solvent, and the component that evaporates upon applying and drying the aqueous composition is primarily water. This makes it possible to greatly reduce the environmental load as compared to the case where an organic solvent is used.

In the present invention, the ratio of the number of atoms of Ti+Zr with respect to the number of atoms of Si ((Ti+Zr)/Si) is 2.5 to 18, and the ratio of the number of atoms of Al with respect to the number of atoms of Si (Al/Si) is 0.08 to 0.22. The ratio ((Ti+Zr)/Si) is preferably 2.5 or more, more preferably 3 or more, further preferably 5 or more. The ratio ((Ti+Zr)/Si) is preferably 18 or less, more preferably 16 or less, further preferably 15 or less. The ratio (Al/Si) is preferably 0.08 or more, more preferably 0.09 or more, further preferably 0.1 or more. The ratio (Al/Si) is preferably 0.22 or less, more preferably 0.21 or less, further preferably 0.20 or less. With these Ti and/or Zr, and Si and Al ratios, the refractive index of the hardcoat layer can effectively improve, and the alkali resistance can increase.

In the present invention, Ti is a metallic element derived from inorganic fine particles titania, Zr is a metallic element derived from inorganic fine particles zirconia, Si is a metallic element derived from the epoxy-containing alkoxysilane and the epoxy-free alkoxysilane, and Al is a metallic element derived from a curing promoting agent aluminum chelate complex.

The hardcoat layer formed from the aqueous composition of the present invention has a haze value or 0.5% or less. The haze value of the hardcoat layer is 0.5% or less, preferably 0.45% or less, more preferably 0.4% or less. In the present invention, the degree of suspension of the aqueous composition is kept very low to reduce the haze value of the hardcoat layer, and the hardcoat layer having excellent optical characteristics can be formed.

In the present invention, the aqueous composition can have a low haze even with the high-refractive-index inorganic fine particles. This was made possible upon successfully finding a method that enables the inorganic fine particles and the curing promoting agent to be mixed without directly contacting each other in the production of the aqueous composition containing inorganic fine particles and a curing promoting agent.

Typically, high-refractive-index inorganic fine particles contact the curing promoting agent in an aqueous composition. This impairs the dispersibility, and increases the degree of suspension. In the present invention, however, the inorganic fine particles and the curing promoting agent are mixed into different aqueous compositions, and these two aqueous solutions containing the inorganic fine particles and the curing promoting agent are mixed to prevent direct contact between the inorganic fine particles and the curing promoting agent in the aqueous composition.

Such a mixing method has been considered unpractical in related art. With the novel method of the present invention, however, it has become possible to increase the dispersibility of the inorganic fine particles and the curing promoting agent. This makes it possible to reduce the degree of suspension of the aqueous composition. Specifically, the present invention can reduce the degree of suspension of the aqueous composition despite using the high-refractive-index inorganic fine particles. The hardcoat layer formed from the aqueous composition with such a low degree of suspension can have a low haze value.

The aqueous composition of the present invention preferably contains an epoxy-containing alkoxysilane, an epoxy-free alkoxysilane, inorganic fine particles, and a curing promoting agent. In the aqueous composition of the present invention, the inorganic fine particles have a refractive index of 2.0 or more, and the curing promoting agent is contained in preferably a proportion of 30 mass % or more with respect to the total mass of the epoxy-containing alkoxysilane and the epoxy-free alkoxysilane.

With the aqueous composition of the foregoing configuration, the present invention can form a hardcoat layer of high alkali resistance. The hardcoat layer formed with the aqueous composition of the present invention has a high refractive index and a low haze value with strong alkali resistance, and is very resistant to dissolving even when dipped in an alkaline solution. The haze value of the hardcoat layer thus does not increase before and after the alkali treatment, and the hardcoat layer can have excellent optical characteristics.

In the present invention, the average particle size of the inorganic fine particles in the aqueous composition is preferably 30 nm or less. With an average particle size of 30 nm or less, the inorganic fine particles are desirably dispersed in the aqueous composition. The degree of suspension thus becomes low in the aqueous composition. The average particle size of the inorganic fine particles in the aqueous composition is preferably 30 nm or less, more preferably 20 nm or less, further preferably 15 nm or less. Smaller average particle sizes are preferred to further reduce the haze value of the aqueous composition.

(Alkoxysilane)

The alkoxysilane (the total of epoxy-containing alkoxysilane and epoxy-free alkoxysilane) is contained in preferably a proportion of 40 to 70 mass % with respect to the total mass of the aqueous composition. The alkoxysilane content is preferably 40 mass % or more, more preferably 45 mass % or more, further preferably 50 mass % or more. The content of the polymerizable monomer is preferably 70 mass % or less, more preferably 65 mass % or less. With the alkoxysilane content falling in these ranges, the time stability of the aqueous composition, and the hardness of the hardcoat layer can improve. It also becomes possible to increase the thickness of the hardcoat layer, and easily form a hardcoat layer of a desired thickness.

The proportion of the epoxy-containing alkoxysilane in the total alkoxysilane composed of the epoxy-containing alkoxysilane and the epoxy-free alkoxysilane is preferably 20 to 85 mass %. The proportion of the epoxy-containing alkoxysilane is preferably 20 mass % or more, more preferably 25 mass % or more, further preferably 30 mass % or more. The proportion of the epoxy-containing alkoxysilane is preferably 85 mass % or less, more preferably 80 mass % or less, further preferably 75 mass % or less. With these proportions of the epoxy-containing alkoxysilane in the total alkoxysilane, the stability of the aqueous composition can improve, and a hardcoat layer of strong alkali resistance can be formed.

The epoxy-containing alkoxysilane is an alkoxysilane having an epoxy group. The epoxy-containing alkoxysilane contains at least one epoxy group per molecule, and the number of epoxy groups is not particularly limited. In addition to the epoxy group, the epoxy-containing alkoxysilane may also have other groups, for example, such as an alkyl group, a urethane group, a urea group, an ester group, and a hydroxyl group.

Examples of the epoxy-containing alkoxysilane used in the present invention include 2-(3,4-epoxycyclohexyl)ethyltrimethoxysilane, 2-(3,4-epoxycyclohexyl)ethyltriethoxysilane, 2-(3,4-epoxycyclohexyl)ethyltriethoxysilane, 2-(3,4-epoxycyclohexyl)ethylmethyldimethoxysilane, 2-(3,4-epoxycyclohexyl)ethylmethyldiethoxysilane, 3-glycidoxypropyltrimethoxysilane, and 3-glycidoxypropyltriethoxysilane. Examples of commercially available products include KBE-403 (Shin-Etsu Chemical Co., Ltd.).

The epoxy-free alkoxysilane is an alkoxysilane having no epoxy group. The epoxy-free alkoxysilane may be any alkoxysilane, as long as it does not have an epoxy group, and may contain groups such as an alkyl group, a urethane group, a urea group, an ester group, and a hydroxyl group.

The epoxy-free alkoxysilane preferably includes at least one of tetraalkoxysilane and trialkoxysilane. Specifically, the epoxy-free alkoxysilane is preferably tetraalkoxysilane or trialkoxysilane, or a mixture of these. The epoxy-free alkoxysilane is particularly preferably a mixture of tetraalkoxysilane and trialkoxysilane. By containing a mixture of tetraalkoxysilane and trialkoxysilane, the hardcoat layer formed therefrom can have sufficient hardness while being moderately flexible.

When the epoxy-free alkoxysilane is a mixture of tetraalkoxysilane and trialkoxysilane, the molar ratio of tetraalkoxysilane and trialkoxysilane is preferably 25:75 to 85:15, more preferably 30:70 to 80:20, further preferably 30:70 to 65:35. With these molar ratios, it becomes easier to control the degree of polymerization of the alkoxysilane within a desired range, and to control the hydrolysis rate, and the solubility of the curing promoting agent.

The tetraalkoxysilane is a tetrafunctional alkoxysilane, with the alkoxy groups each containing preferably 1 to 4 carbon atoms. Particularly preferred for use are tetramethoxysilane, and tetraethoxysilane. With at most 4 carbon atoms, the hydrolysis rate of the tetraalkoxysilane does not become overly slow upon mixing acid water, and the time for dissolution required to obtain a homogenous aqueous solution can be reduced. This makes it possible to produce the hardcoat layer with improved efficiency. Examples of commercially available products include KBE-04 (Shin-Etsu Chemical Co., Ltd.).

The trialkoxysilane is a trifunctional alkoxysilane represented by the following formula (1).

$$RSi(OR^1)_3 \qquad (1)$$

In the formula, R is an organic group of 1 to 15 carbon atoms containing no amino group, and $R^1$ is an alkyl group of 4 or less carbon atoms, such as methyl and ethyl.

The trifunctional alkoxysilane represented by formula (1) does not contain an amino group as a functional group. Specifically, the trifunctional alkoxysilane has an organic group R that does not have an amino group. When the organic group R has an amino group, it promotes dehydrocondensation between the silanol molecules that generate in the hydrolysis upon mixing with the tetrafunctional alkoxysilane. This makes the aqueous composition unstable, which is not preferable.

The organic group R in formula (1) is an organic group with a molecular chain of 1 to 15 carbon atoms. With at most 15 carbon atoms, the flexibility of the hardcoat layer formed therefrom does not become excessively high, and sufficient hardness can be obtained. With this range of carbon atoms in the organic group R, the hardcoat layer can have improved brittleness. The adhesion between the hardcoat layer and other films such as a support also can improve.

The organic group R may contain heteroatoms such as oxygen, nitrogen, and sulfur. With the organic group containing a heteroatom, the adhesion with other films can further improve.

Examples of the trialkoxysilane include vinyltrimethoxysilane, 3-methacryloxypropyltrimethoxysilane, 3-acryloxypropyltrimethoxysilane, 3-chloropropyltrimethoxysilane, 3-ureidopropyltrimethoxysilane, propyltrimethoxysilane, phenyltrimethoxysilane, vinyltriethoxysilane, 3-methacryloxypropyltriethoxysilane, 3-acryloxypropyltriethoxysilane, 3-chloropropyltriethoxysilane, 3-ureidopropyltriethoxysilane, methyltriethoxysilane, methyltrimethoxysilane, ethyltriethoxysilane, ethyltrimethoxysilane, propyltriethoxysilane, propyltrimethoxysilane, phenyltriethoxysilane, and phenyltrimethoxysilane. Particularly preferred for use are methyltriethoxysilane and methyltrimethoxysilane. Examples of commercially available products include KBE-13 (Shin-Etsu Chemical Co., Ltd.).

In addition to the alkoxysilanes, the aqueous composition may contain known curable resins. Examples of known curable resins include thermosetting resins, and activation energy ray polymerizable resins.

Thermosetting resins are resins that cure under applied heat. The thermosetting resins may use a crosslinking reaction of prepolymers such as melamine resin, urethane resin, and epoxy resin. Examples of the thermosetting resins include carboxyl (—COOH)— and/or hydroxyl (—OH)-containing polyester resin, epoxy resin, polyacrylate resin, polymethacrylate resin, polyamide resin, fluororesin, polyimide resin, polyurethane resin, and alkyd resin.

The activation energy ray polymerizable resin is formed by applying a coating solution containing a multifunctional monomer and a polymerization initiator, and polymerizing the multifunctional monomer with activation energy rays. Examples of the functional groups of the monomer include groups with polymerizable unsaturated double bonds. Examples of groups with polymerizable unsaturated double bonds include acrylate, methacrylate, and vinyl. Preferred for reactivity is acrylate.

The activation energy rays may be, for example, radiation, gamma rays, alpha rays, an electron beam, or ultraviolet light. Preferred is ultraviolet (UV) light. Examples of the UV-curable resins include acrylic resins formed of acrylic monomer, and epoxy resins and urethane resins.

(Curing Promoting Agent (Metal Complex))

The aqueous composition of the present invention contains a curing promoting agent (metal complex). The curing promoting agent (metal complex) is preferably selected from curing promoting agents (metal complexes) formed of Al, Mg, Mn, Ti, Cu, Co, Zn, Hf, and Zr, and these may be used alone or in combination.

The curing promoting agent can easily be obtained through reaction of a metal alkoxide with a chelating agent. Examples of the chelating agent include β-diketones such as acetylacetone, benzoylacetone, and dibenzoylmethane, and β-keto acid esters such as ethyl acetoacetate, and benzoylethyl acetate.

Specific examples of the curing promoting agent include aluminum chelate compounds (such as ethylacetoacetatealuminum diisopropylate, aluminum tris(ethylacetoacetate), alkylacetoacetatealuminum diisopropylate, aluminum monoacetylacetate bis(ethylacetoacetate), and aluminum tris(acetylacetonate)), magnesium chelate compounds (such as ethylacetoacetate magnesium monoisopropylate, magnesium bis(ethylacetoacetate), alkylacetoacetate magnesium monoisopropylate, and magnesium bis(acetylacetonate)), zirconium tetraacetylacetonate, zirconium tributoxyacetylacetonate, zirconium acetylacetonate bis(ethylacetoacetate), manganese acetylacetonate, cobalt acetylacetonate, copper acetylacetonate, titanium acetylacetonate, and titanium oxyacetylacetonate. Preferred are aluminum tris(acetylacetonate), aluminum tris(ethylacetoacetate), magnesium bis(acetylacetonate), magnesium bis(ethylacetoacetate), and zirconium tetraacetylacetonate. Particularly preferred for preservation stability and availability are aluminum tris(acetylacetonate) and aluminum tris(ethylacetoacetate), which are aluminum chelate complexes. Examples of commercially available products include Aluminum Chelate A (W), Aluminum Chelate D, and Aluminum Chelate M (Kawaken Fine Chemicals).

The proportion of the curing promoting agent with respect to the total mass of the epoxy-containing alkoxysilane and the epoxy-free alkoxysilane is preferably 30 mass % or more, more preferably 35 mass % or more, further preferably 40 mass % or more. The proportion of the curing promoting agent is 90 mass % or less, preferably 75 mass % or less, more preferably 60 mass % or less.

In the present invention, with these lower limits of the curing promoting agent, the haze value of the aqueous composition can be reduced, and the hardcoat layer formed therefrom can have excellent alkali resistance. With the foregoing upper limits of the curing promoting agent, the aqueous solution can have desirable dispersibility, and the manufacturing cost can be reduced.

(Inorganic Fine Particles)

The aqueous composition of the present invention further contains inorganic fine particles. The proportion of the inorganic fine particles in the total solid content of the aqueous composition is preferably 10 mass % or more, more preferably 12 mass % or more, further preferably 14 mass % or more. The proportion of the inorganic fine particles is preferably 30 mass % or less, more preferably 28 mass % or less, further preferably 25 mass % or less. In the present invention, the proportion of the inorganic fine particles can be made 30 mass % or less because the inorganic fine particles are uniformly dispersed in the aqueous composition. The hardcoat layer can have high hardness even with these low proportions of the inorganic fine particles.

Two or more kinds of inorganic fine particles may be used in combination. In this case, the total of all inorganic fine particles is used in the foregoing proportions. With the foregoing proportions of the inorganic fine particles, the dispersibility of the inorganic fine particles in the aqueous composition can improve. The hardness, the scratch resistance, and the impact resistance of the hardcoat layer formed therefrom can also improve.

Because the inorganic fine particles are used directly below a transparent conductive film, it is preferable to use transparent and insulating materials, such as transparent and insulating metal oxide fine particles. Specific examples of metal oxides used in the present invention include fine particles of zirconia or titania. Zirconia and titania are preferred for their high refractive indices. Titania is particularly preferred.

The inorganic fine particles have an average particle size of preferably 1 to 30 nm, more preferably 1 to 20 nm. With these average particle sizes of inorganic fine particles, the haze value of the aqueous composition can be reduced. It is also possible to increase the transparency of the hardcoat layer, and evenly control the refractive index within the layer.

The average particle size of the inorganic fine particles may be determined from a transmission electron micrograph of the dispersed particles. From a projected area of particles, the equivalent circle diameter is determined as the average particle size (average primary particle size). In this specification, the average particle size may be calculated by finding the equivalent circle diameter from the measurement of the projected area of at least 300 particles.

Examples of the titania (titanium oxide) that can be used in the present invention include the TTO-55, 51, S, M, and D series (Ishihara Sangyo), the JR series and the JA series (Tayca), and rutile-type titania (e.g., SRD-W, Sakai Chemical Industry Co., Ltd.). Examples of zirconia (zirconium oxide) include SZR-CW (Sakai Chemical Industry Co., Ltd.).

(Curing Promoting Agent)

The aqueous composition of the present invention further contains a curing promoting agent. The curing promoting agent is preferably water soluble. The curing promoting agent used in the present invention acts to promote formation of siloxane bonds through dehydrocondensation of silanol in the aqueous composition. The curing promoting agent may be a water-soluble inorganic acid, organic acid, organic acid salt, inorganic acid salt, metal alkoxide, or metal complex. The metal complex is preferably selected from metal complexes of Al, Mg, Mn, Ti, Cu, Co, Zn, Hf, and Zr, and these may be used alone or in combination.

Examples of the inorganic acid include boric acid, phosphoric acid, hydrochloric acid, nitric acid, and sulfuric acid. Examples of the organic acid include acetic acid, formic acid, oxalic acid, citric acid, malic acid, and ascorbic acid. Examples of the organic acid salt include aluminum acetate, aluminum oxalate, zinc acetate, zinc oxalate, magnesium acetate, magnesium oxalate, zirconium acetate, and zirconium oxalate. Examples of the inorganic acid salt include aluminum chloride, aluminum sulfate, aluminum nitrate, zinc chloride, zinc sulfate, zinc nitrate, magnesium chloride, magnesium sulfate, magnesium nitrate, zirconium chloride, zirconium sulfate, and zirconium nitrate. Examples of the metal alkoxide include aluminum alkoxide, titanium alkoxide, and zirconium alkoxide. Examples of the metal complex include aluminum chelate compounds (such as ethylacetoacetatealuminum diisopropylate, aluminum tris(ethylacetoacetate), alkylacetoacetatealuminum diisopropylate, aluminum monoacetylacetate bis(ethylacetoacetate), and aluminum tris(acetylacetonate)), magnesium chelate compounds (such as ethylacetoacetate magnesium monoisopropylate, magnesium bis(ethylacetoacetate), alkylacetoacetate magnesium monoisopropylate, and magnesium bis(acetylacetonate)), zirconium tetraacetylacetonate, zirconium tributoxyacetylacetonate, zirconium acetylacetonate bis(ethylacetoacetate), manganese acetylacetonate, cobalt acetylacetonate, copper acetylacetonate, titanium acetylacetonate, and titanium oxyacetylacetonate. Preferred are aluminum tris(acetylacetonate), aluminum tris(ethylacetoacetate), magnesium bis(acetylacetonate), magnesium bis(ethylacetoacetate), and zirconium tetraacetylacetonate. Particularly preferred for preservation stability and availability are aluminum tris(acetylacetonate), and aluminum tris(ethylacetoacetate), which are aluminum chelate complexes. Examples of commercially available products include Aluminum Chelate A (W) (Kawaken Fine Chemicals).

It is preferable that the curing promoting agent is uniformly mixed and dissolved in the coating solution. Preferably, the curing promoting agent is soluble in water used as a coating solution solvent in the present invention. When the solubility in water is low, the curing promoting agent exists as a solid in the coating solution, and becomes a residual foreign object upon being applied and dried, with the result that the resulting hardcoat layer may suffer from poor transparency in some cases.

The proportion of the curing promoting agent with respect to the total mass of the epoxy-containing alkoxysilane and the epoxy-free alkoxysilane is preferably 30 mass % or more, more preferably 35 mass % or more, further preferably 40 mass % or more. The proportion of the curing promoting agent is 90 mass % or less, preferably 75 mass % or less, further preferably 60 mass % or less.

With these proportions of the curing promoting agent, the dehydrocondensation of silanol proceeds at an appropriate reaction rate. Further, with the foregoing proportions of the curing promoting agent, the present invention can form a hardcoat layer having excellent alkali resistance.

(Other Additives)

The aqueous composition of the present invention may contain a surfactant to improve the flatness of the hardcoat layer and reduce the coating surface friction. It is also possible to disperse pigments, dyes, and other fine particles to color the hardcoat layer. Additives such as UV absorbers and antioxidants also may be added to improve weather resistance.

(Surfactant)

In order to further improve coatability, the aqueous composition of the present invention may contain various surfactants. A variety of surfactants may be used, including, for example, fluorosurfactants, nonionic surfactants, cationic surfactants, anionic surfactants, and silicone-based surfactants.

Examples of the fluorosurfactants include Megafac F171, F172, F173, F176, F177, F141, F142, F143, F144, R30, F437, F475, F479, F482, F554, F780, and F781 (all available from DIC), Fulorad FC430, FC431, FC171 (all available from Sumitomo 3M), Surflon S-382, SC-101, SC-103, SC-104, SC-105, SC1068, SC-381, SC-383, 5393, KH-40 (all available form Asahi Glass Co., Ltd.), and PF636, PF656, PF6320, PF6520, PF7002 (OMNOVA).

Specific examples of the nonionic surfactants include glycerol, trimethylolpropane, trimethylolethane, and ethoxylates and propoxylates thereof (for example, glycerol propoxylate, glycerine ethoxylate), polyoxyethylene lauryl ether, polyoxyethylene stearyl ether, polyoxyethylene oleyl ether, polyoxyethylene octylphenyl ether, polyoxyethylene nonylphenyl ether, polyethylene glycol dilaurate, polyethylene glycol distearate, sorbitan fatty acid esters (BASF products Pluronic L10, L31, L61, L62, 10R5, 17R2, 25R2, Tetronic 304, 701, 704, 901, 904, 150R1; Pionin D-6512, D-6414, D-6112, D-6115, D-6120, D-6131, D-6108-W, D-6112-W, D-6115-W, D-6115-X, D-6120-X (Takemoto Oil & Fat); Solsperse 20000 (The Lubrizol Corporation), and Naroacty CL-95, HN-100 (Sanyo Chemical Industries, Ltd.)).

Specific examples of the cationic surfactants include phthalocyanine derivatives (EFKA-745, Morishita Sangyo), organosiloxane polymer KP341 (Shin-Etsu Chemical Co., Ltd.), (meth)acrylic acid (co)polymer Polyflow No. 75, No. 90, No. 95 (Kyoeisha Chemical Co., Ltd.), and W001 (Yusho).

Specific examples of the anionic surfactants include W004, W005, W017 (Yusho), and Sandetto BL (Sanyo Chemical Industries, Ltd.).

Examples of the silicone-based surfactants include Toray Silicones DC3PA, SH7PA, DC11PA, SH21PA, SH28PA, SH29PA, SH30PA, and SH8400 (Dow Corning Toray Co., Ltd.); TSF-4440, TSF-4300, TSF-4445, TSF-4460, and TSF-4452 (Momentive Performance Materials Inc.); KP341, KF6001, and KF6002 (Shin-Etsu Silicone); and BYK307, BYK323, and BYK330 (BYK-Chemie). The surfactants may be used alone or in a combination of two or more kinds thereof.

The surfactant is added in an amount of preferably 0.001 mass % to 2.0 mass %, more preferably 0.005 mass % to 1.0 mass % with respect to the total mass of the aqueous composition.

(Hardcoat Layer)

The hardcoat layer is formed by applying and drying the aqueous composition on a support. As used herein, "laminated film" refers to a film with the hardcoat layer laminated on a support. In the laminated film, an easily bondable layer may be provided between the hardcoat layer and the support to improve the adhesion between the hardcoat layer and the support.

The thickness of the hardcoat layer can be controlled by adjusting the amount of the aqueous composition applied. For hardness, the hardcoat layer has a constant thickness preferably in a range of 0.3 to 12 With a thickness of less than 0.3 μm, sufficient hardness may not develop, and the hardcoat layer may fail to serve its function. Above 12 μm, the internal stress of the hardcoat layer increases, and may cause deformation such as curling. The preferred thickness range is from 0.5 to 10 μm.

The hardcoat layer of the present invention has a haze value of preferably 0.5% or less, more preferably 0.45% or less, further preferably 0.4% or less. The present invention forms the hardcoat layer with the low-haze aqueous composition, and the hardcoat layer can have a low haze value despite containing high-refractive-index inorganic fine particles.

The hardcoat layer of the present invention has a refractive index of preferably 1.50 to 2.30, more preferably 1.60 to 2.20, further preferably 1.70 to 2.10, even more preferably 1.90 to 2.10.

A transparent electrode layer may be laminated on the hardcoat layer to make a touch panel. The transparent electrode layer typically uses ITO (indium tin oxide), and the ITO conductive film is patterned to form an electrode pattern. The hardcoat layer and the transparent electrode layer may be laminated in contact with each other, or a modulation layer such as an optical modulation layer may be laminated between the hardcoat layer and the transparent electrode. The optical modulation layer is provided to adjust the refractive index difference between the layers.

The refractive index of ITO is about 2.00, larger than the refractive index, about 1.6, of the polyester film provided as the supporting substrate. The intensity of reflected outside light thus becomes different in portions where the ITO is present and the ITO is absent, which makes the ITO pattern visible. This severely deteriorates the display quality. This phenomenon is called visible ITO patterns.

However, with the hardcoat layer having a refractive index in the foregoing ranges, the visible patterns of the transparent electrode can be reduced in a touch panel fabricated by laminating the transparent electrode layer or other layers on the hardcoat layer. Specifically, the hardcoat layer of the present invention is particularly preferred for use in a laminated film formed by using a polyester film support and laminating an ITO conductive film for touch panel applications.

The hardcoat layer of the present invention also may be used for laminated films having other layer configurations. Specifically, the hardcoat layer of the present invention may be used with, for example, an optical modulation layer, a gas barrier layer, a transparent electrode layer such as ITO electrodes, a prism layer, and an antireflective layer.

(Laminated Film)

In the present invention, the hardcoat layer is preferably formed on a support, and the invention also encompasses such a form of the laminated film. Preferably, the present invention forms a laminated film with the hardcoat layer formed on at least one surface of a polyester film.

More preferably, the present invention forms a laminated film with an easily bondable layer, an optical modulation layer, and the hardcoat layer formed in this order on a polyester film.

In the laminated film with an easily bondable layer, an optical modulation layer, and the hardcoat layer formed on the polyester film, it is preferable that the difference in the refractive indices of the easily bondable layer and the polyester film is 0.03 or less, and that the optical modulation layer has a refractive index of 1.75 to 1.90, and the hardcoat layer has a refractive index of 1.90 to 2.10.

The difference in the refractive indices of the easily bondable layer and the polyester film is more preferably 0.02 or less, further preferably 0.015 or less. The refractive index of the optical modulation layer is more preferably 1.78 to 1.87, further preferably 1.80 to 1.85.

In the laminated film of the present invention, the interlayer adhesion can be improved and the iridescence can be reduced by confining the refractive index difference of the easily bondable layer and the polyester film within the foregoing ranges.

The hardcoat layer of the present invention has a refractive index of about 2.00, larger than the refractive index, about 1.66, of the polyester film provided as the supporting substrate. When the hardcoat layer of the present invention is directly deposited on the film with a refractive index of 1.66, light is reflected at the surface and the interface, and interferes to cause subtle thickness fluctuations. Such thickness fluctuations tend to be perceived as nonuniformity, or iridescence as it is also called.

The present invention can prevent iridescence by providing an optical modulation layer, and setting the refractive indices of the easily bondable layer, the optical modulation layer, and the hardcoat layer in the foregoing ranges. The optical modulation layer is provided to adjust the refractive index differences between the layers.

The support used to laminate the hardcoat layer may be formed from a polymer compound shaped into a form of a film by using a melt deposition method or a solution deposition method. The polymer compounds used as the support are not particularly limited. Preferred examples include polyethylene terephthalate (PET), polyethylene naphthalate (PEN), polybutylene terephthalate (PBT), polybutylene naphthalate (PBN), polyallylates, polyethersulfone, polycarbonate, polyetherketone, polysulfone, polyphenylene sulfide, polyester liquid crystal polymer, triacetyl cellulose, cellulose derivatives, polypropylene, polyamides, polyimides, and polycycloolefins. PET, PEN, triacetyl cellulose, and cellulose derivatives are more preferred, and PET and PEN are particularly preferred.

Preferably, the support is biaxially stretched. Biaxial stretch refers to stretching the film along each axis representing the width direction and the longitudinal direction. Because of the sufficiently regulated molecular alignment along the two axes, the biaxially stretched polyester film has excellent mechanical strength. The stretch rate is not particularly limited, and is preferably 1.5 to 7 times, more preferably 2 to 5 times in each direction. The molecular alignment in a polyester film becomes more efficiently and effectively regulated when the film is biaxially stretched 2 to 5 times in each axial direction. Such a polyester film has excellent mechanical strength, and is preferred for use.

The support surface may be subjected to a corona treatment or a glow treatment. The surface treatment renders the support surface hydrophilic, and can improve the wettability for the aqueous composition to further improve the adhesion with the hardcoat layer or the easily bondable layer.

The easily bondable layer is appropriately provided for the support to improve the adhesion between the support and the hardcoat layer, and the adhesion with the hardcoat layer. The easily bondable layer is typically formed by applying a coating solution of a binder, a curing agent, and a surfactant to the support surface on which the hardcoat layer is to be provided. The easily bondable layer may contain organic or inorganic fine particles, as appropriate. The fine particles are not particularly limited, and may be, for example, metal oxides. Specifically, preferred examples include tin oxide, zirconium oxide, zinc oxide, titanium oxide, cerium oxide, and niobium oxide. These may be used alone or in a combination of two or more kinds thereof. Examples of commercially available products include the ET series (e.g., ET-500W), the FT series (e.g., FT-2000), the SN series (e.g., SN-100P), and the FS series (e.g., FS-10D) available from Ishihara Sangyo, and the ZR-30BF available from Sakai Chemical Industry Co., Ltd.

The binder used for the easily bondable layer is not particularly limited. However, preferred for adhesion is at least one of polyester, polyurethane, acrylic resin, and a styrene butadiene copolymer. For environmental friendliness, the binder is particularly preferably a water-soluble or a water-dispersive binder. Examples of commercially available products include the Carbodilite series (e.g., Carbodilite V-02-L2) available from Nisshinbo, and the Takelac WS series (e.g., Takelac WS-5100) available from Mitsui Chemicals.

The thickness of the easily bondable layer can be appropriately adjusted by adjusting the amount applied. Preferably, the easily bondable layer has a constant thickness in a 0.01 to 5 μm range. The adhesion may become insufficient when the thickness is less than 0.01 μm. Above 5 μm, it becomes difficult to form an easily bondable layer of uniform thickness, or the solution may need to be used in increased amounts, or require a long drying time, which leads to increased costs. The more preferred thickness range is 0.02 to 3 μm. The easily bondable layer may be a single layer, or may have a form of a plurality of laminated layers. When a plurality of easily bondable layers is laminated, the total thickness of all layers represents the thickness of the easily bondable layer.

(Touch Panel)

A transparent electrode layer may be laminated on the hardcoat layer of the laminated film to make a touch panel. The transparent electrode layer that can be used to make a touch panel in the present invention may be any of indium oxide, zinc oxide, and tin oxide, or a mixed oxide of two or three of these oxides, with or without additives. However, various other materials may be used for different purposes and applications, and the material of the transparent electrode layer is not particularly limited. The material that is at present considered to be most reliable and widely proven is the indium tin oxide (ITO). The transparent electrode layer may be produced by using any deposition method, provided that the thickness can be controlled. For example, the method described in JP-A-2012-206307 may be used.

The touch panel of the present invention may be used as an input device by being incorporated into display devices such as liquid crystal displays, plasma displays, organic EL displays, CRT displays, and electronic paper. With the touch panel of the present invention, it is possible to reduce interference patterns, and provide desirable color perception.

The touch panel may be of any configuration, including resistive touch panels and capacitive touch panels. The touch panel of the present invention is preferably a capacitive input device for its advantage that a translucent conductive film merely needs to be formed on a single substrate. For example, the capacitive input device is preferably of a type in which the transparent electrode layer is provided in patterns of orthogonally extending electrodes, and that detects a capacitance change between the electrodes when the touch panel is touched by fingers or other input means to detect the input location. See, for example, JP-A-2010-86684, JP-A-2010-152809, and JP-A-2010-257492 for detailed configurations of such a touch panel.

An image display device including a touch panel as a component may use the configurations described in, for example, *Current Touch Panel Techniques*, Published Jul. 6, 2009, Techno-Times, ed., Yuji MITSUTA; Touch Panel Technology and Development, CMC (December, 2004); Lecture Textbook for FPD International 2009 Forum T-11; and Application Note AN2292, Cypress Semiconductor Corporation.

See, for example, JP-A-2002-48913 for detailed configurations of touch-panel compatible liquid crystal displays.

(Producing Method)

An aqueous composition producing method of the present invention includes: obtaining a first aqueous composition that contains an epoxy-containing alkoxysilane, an epoxy-free alkoxysilane, and inorganic fine particles; obtaining a second aqueous composition that contains an epoxy-containing alkoxysilane, and epoxy-free alkoxysilane, and a curing promoting agent; and mixing the first aqueous composition and the second aqueous composition. Specifically, in the aqueous composition producing method of the present invention, the inorganic fine particles and the curing promoting agent are separately mixed in different aqueous compositions, and the two aqueous compositions respectively containing the inorganic fine particles and the curing promoting agent are mixed with each other. The inorganic fine particles become uniformly dispersed in the mixed aqueous composition, and the aqueous composition can have a haze value of not greater than a certain value.

Conceivably, the inorganic fine particles and the curing promoting agent become "coated" with the alkoxysilanes upon being separately added to alkoxysilane-containing aqueous solutions. The inorganic fine particles and the curing promoting agent in such a coated state do not directly contact each other, and become uniformly dispersed in the aqueous composition upon being brought together by mixing the aqueous compositions respectively containing these components.

The mass ratio of the first aqueous composition and the second aqueous composition is preferably 3:7 to 9:1, more preferably 4:6 to 9:1, further preferably 4:6 to 8:2, particularly preferably 4:6 to 7:3. With the mass ratio of the first aqueous composition and the second aqueous composition falling in these ranges, the inorganic fine particles and the curing promoting agent can become uniformly dispersed in the aqueous compositions.

The inorganic fine particles contained in the aqueous composition obtained after the foregoing steps of the present invention can have an average particle size of 30 nm or less. This indicates that the inorganic fine particles and the curing promoting agent are uniformly dispersed in the aqueous composition without directly contacting each other in the same solution.

The hardcoat layer is formed by applying the aqueous composition to a surface of a support such as a polyester film.

Preferably, the pH of the aqueous composition used to form the hardcoat layer is adjusted in advance. For example, it is preferable to adjust the aqueous composition to the desired pH by adding an acidic solution to the aqueous composition before application. Preferably, the acidic solution has a pH of 2 to 6, and the aqueous composition is adjusted to pH 2 to 7, preferably pH 2 to 6.

The aqueous composition may be coated while stretching the polyester film. It is, however, preferable to coat the aqueous solution after stretching the polyester film. The aqueous composition may be coated by appropriately using a known coater. For example, it is possible to use a spin coater, a roll coater, a bar coater, and a curtain coater.

The coating is followed by drying of the coating solution. The drying is preferably heat drying. Preferably, the heat drying is a heat treatment that makes the temperature of the coated film 120° C. or more, more preferably 140° C. or more, further preferably 160° C. or more. The temperature of the coated film is preferably 300° C. or less, more preferably 280° C. or less, further preferably 260° C. or less. With these heat treatment temperatures, the coated film can be sufficiently cured, and the hardcoat layer can be prevented from being deformed. The heating time is 10 seconds to 1 hour, preferably 10 seconds to 5 minutes. In the present invention, the heating merely requires a temperature of about 120° C. to 300° C., and a short heating time of about 10 seconds to 1 hour. This can improve the production efficiency, and reduce the production cost.

The laminated film obtained after the drying may be rolled into a roll, or may be cut into a sheet form. The heat treatment may be performed during the drying step after the coating, or may be performed after rolling the film.

Other constituent layers may be laminated on the hardcoat layer to make a display device such as a touch panel. The method used to laminate such other constituent layers may be appropriately selected from known methods.

EXAMPLES

The present invention is described below in greater detail using Examples and Comparative Examples. Materials, amounts, proportions, and the contents and the procedures of the processes used in the following Examples may be appropriately varied, provided that such changes do not depart from the gist of the present invention. Accordingly, the scope of the present invention should not be narrowly interpreted within the limits of the concrete examples described below.

Example 1

(Preparation of Aqueous Solution for Easily Bondable Layer)

An aqueous solution for easily bondable layer was prepared by mixing the following components.

Zirconia fine particle dispersion: 75 parts by mass (15% aqueous solution of zirconia dispersion SZR-CW, Sakai Chemical Industry Co., Ltd.)

Polyurethane: 2.8 parts by mass (Takelac WS-5100, Mitsui Chemicals)

Crosslinker: 4.2 parts by mass (10% diluted solution of Carbodilite V-02-L2, Nisshinbo Chemicals)

Surfactant A: 0.2 parts by mass (10% aqueous solution of Sandetto BL, Sanyokasei Co., Ltd.; anionic surfactant)

Surfactant B: 0.2 parts by mass (10% diluted solution of Naroacty CL-95, Sanyokasei Co., Ltd.; nonionic surfactant)

Water: 17.6 parts by mass (Preparation of Aqueous Composition for Hardcoat Layer)

An aqueous composition for hardcoat layer was prepared by mixing the following compounds in the mixture ratio shown in Table 1.

Epoxy-containing alkoxysilane (3-glycidoxypropyltriethoxysilane; KBE-403, Shin-Etsu Chemical Co., Ltd.)

Tetraalkoxysilane (tetraethoxysilane; KBE-04, Shin-Etsu Chemical Co., Ltd.)

Trialkoxysilane (methyltriethoxysilane; KBE-13, Shin-Etsu Chemical Co., Ltd.)

Acetic acid aqueous solution (1% aqueous solution of industrial acetic acid, Daicel Chemical Industries, Ltd.)

Aluminum chelate complex (Aluminum Chelate D, Kawaken Fine Chemicals)

Titania dispersion (SRD-W, Sakai Chemical Industry Co., Ltd.)

The composition was prepared by using the following procedures.

The epoxy-containing alkoxysilane (24 parts by mass), and 1% acetic acid (26 parts by mass) were mixed, and sufficiently hydrolyzed. The tetraalkoxysilane (9 parts by mass) was then added to the hydrolysis solution, and the mixture was sufficiently hydrolyzed. The hydrolysis solution was separated into two equal portions, and the titania dispersion (700 parts by mass) and the aluminum chelate D (10 parts by mass) were separately added to these portions respectively. These were mixed, and water was added to obtain the aqueous composition having a solid content concentration of 15%.

(Formation of Easily Bondable Layer and Hardcoat Layer)

A glass or a PET base was subjected to a corona treatment, and the aqueous solution for easily bondable layer was applied with a #4 wire bar, and dried at 150° C. for 2 minutes. After another corona treatment, the aqueous composition was applied with a #4 wire bar, and dried at 150° C. for 2 minutes.

Examples 2 to 13

An easily bondable layer was formed in the same manner as in Example 1, and an aqueous composition prepared in the mixture ratio shown in Table 1 was applied in the same manner as in Example 1 to produce a hardcoat layer.

Comparative Example 1

The epoxy-containing alkoxysilane (24 parts by mass), and 1% acetic acid (26 parts by mass) were mixed, and sufficiently hydrolyzed. The tetraalkoxysilane (9 parts by mass) was then added to the hydrolysis solution, and the mixture was sufficiently hydrolyzed. After adding the titania dispersion (700 parts by mass), the aluminum chelate D (10 parts by mass) was added, and water was added to obtain an aqueous composition having a solid content concentration of 15%.

Comparative Example 2

The epoxy-containing alkoxysilane (24 parts by mass), and 1% acetic acid (26 parts by mass) were mixed, and sufficiently hydrolyzed. The tetraalkoxysilane (9 parts by mass) was then added to the hydrolysis solution, and the mixture was sufficiently hydrolyzed. Concurrently, titania dispersion (700 parts by mass) and aluminum chelate D (10 parts by mass) were mixed, and immediately after that, the hydrolysis solution was immediately added thereto. Water was then added to obtain an aqueous composition having a solid content concentration of 15%.

Comparative Example 3

The epoxy-containing alkoxysilane (24 parts by mass), and 1% acetic acid (26 parts by mass) were mixed, and sufficiently hydrolyzed. The tetraalkoxysilane (9 parts by mass) was then added to the hydrolysis solution, and the mixture was sufficiently hydrolyzed. Aluminum chelate D (10 parts by mass) was then added to the hydrolysis solution, and titania dispersion (700 parts by mass) was added to the mixture. Water was added to obtain an aqueous composition having a solid content concentration of 15%.

The aqueous compositions were applied in the same manner as in Example 1 to produce hardcoat layers.

Comparative Examples 4 to 6

An easily bondable layer was formed in the same manner as in Example 1, and an aqueous composition was prepared in the mixture ratio shown in Table 1. The aqueous composition was prepared by using the same procedures as those described in Example 1. The obtained aqueous composition was applied in the same manner as in Example 1 to produce a hardcoat layer.

(Evaluations)

<Average Particle Size>

The average particle size of the inorganic fine particles contained in the aqueous compositions of Examples and Comparative Examples was measured with a Microtrac MT3300EX (Nikkiso Co., Ltd.). The inorganic fine particles in the aqueous compositions of Examples had average particle sizes of 30 nm or less. In contrast, the average particle sizes of the inorganic fine particles in the aqueous compositions of Comparative Examples were larger than 30 nm.

<Haze Value>

The samples prepared by applying the aqueous compositions of Examples and Comparative Examples on glass substrates were measured for haze value with a haze measurement device NDH 5000 (Nippon Denshoku Industries Co., Ltd.). The haze value of the glass substrate itself was also measured using the same device. The haze value of the aqueous composition was found by subtracting the haze value of the glass substrate from the haze value of the coated sample.

<Alkali Resistance>

The hardcoat layers formed with the aqueous compositions of Examples and Comparative Examples were dipped in a 5% NaOH aqueous solution at 25° C. for 5 minutes, and were measured for haze value before and after the treatment. The hardcoat layers were evaluated according to the increment of haze value, as follows.

A: Haze value increment of 0.1 or less

B: Haze value increment of more than 0.1 and 0.5 or less

C: Haze value increment of more than 0.5

<Refractive Index>

For refractive index measurement, the aqueous composition was coated over a silicon wafer multiple times until the thickness reached about 2 μm, and the refractive index was measured with a Prism Coupler SPA-4000 (SAIRON TECHNOLOGY).

TABLE 1

| | Hardcoat layer | Method of mixing curing promoting agent and inorganic fine particles | Aqueous composition | | | Curing promoting agent Mass parts | Content of curing promoting agent (wrt all alkoxysilane) Mass % |
| | | | Epoxy-containing alkoxysilane Mass parts | Epoxy-free alkoxysilane | | | |
| | | | | Tetraethoxysilane Mass parts | Triethoxysilane Mass parts | | |
|---|---|---|---|---|---|---|---|
| Com. Ex. 1 | PET | Single | 24 | 9 | — | 10 | 30.3 |
| Com. Ex. 2 | PET | Single | 24 | 9 | — | 10 | 30.3 |
| Com. Ex. 3 | PET | Single | 24 | 9 | — | 10 | 30.3 |
| Com. Ex. 4 | PET | Double | 34 | 12 | — | 2 | 4.3 |
| Com. Ex. 5 | PET | Double | 29 | 11 | — | 6 | 15.0 |
| Com. Ex. 6 | PET | Double | 21 | 8 | — | 14 | 48.3 |
| Ex. 1 | PET | Double | 24 | 9 | — | 10 | 30.3 |
| Ex. 2 | PET | Double | 22 | 8 | — | 13 | 43.3 |
| Ex. 3 | PET | Double | 24 | — | 9 | 10 | 30.3 |
| Ex. 4 | PET | Double | 22 | — | 8 | 13 | 43.3 |
| Ex. 5 | PET | Double | 22 | 15 | — | 10 | 27.0 |
| Ex. 6 | PET | Double | 17 | 24 | — | 10 | 24.4 |
| Ex. 7 | PMMA | Double | 24 | 9 | — | 10 | 30.3 |
| Ex. 8 | PET | Double | 20 | 7 | — | 8 | 29.6 |
| Ex. 9 | PET | Double | 19 | 7 | — | 5 | 19.2 |
| Ex. 10 | PET | Double | 23 | 8 | — | 5 | 16.1 |
| Ex. 11 | PET | Double | 30 | 11 | — | 13 | 31.7 |
| Ex. 12 | PET | Double | 32 | 12 | — | 13 | 29.5 |
| Ex. 13 | PET | Double | 39 | 14 | — | 17 | 32.1 |

| | Aqueous composition | | | | | | Evaluations of hardcoat layer | |
| | Inorganic fine paticles | | | | | | | |
| | Refractive index | Amount Mass parts | Average particle size nm | Metal composition ratio | | Haze % | Refractive index | Alkali resistance |
| | | | | (Ti + Zi)/Si Proportion | Ai/Si Proportion | | | |
|---|---|---|---|---|---|---|---|---|
| Com. Ex. 1 | 2.54 | 700 | >10 | 10 | 0.15 | >0.5 | Unmeasurable (high haze) | |
| Com. Ex. 2 | 2.54 | 700 | >10 | 10 | 0.15 | >0.5 | Unmeasurable (high haze) | |
| Com. Ex. 3 | 2.54 | 700 | >10 | 10 | 0.15 | >0.5 | Unmeasurable (high haze) | |
| Com. Ex. 4 | 2.54 | 700 | ≤10 | 7.28 | 0.02 | <0.5 | 1.97 | C |
| Com. Ex. 5 | 2.54 | 700 | ≤10 | 8.33 | 0.07 | <0.5 | 1.99 | B |
| Com. Ex. 6 | 2.54 | 700 | >10 | | | Insoluble | | |
| Ex. 1 | 2.54 | 700 | ≤10 | 10 | 0.15 | <0.5 | 2.01 | A |
| Ex. 2 | 2.54 | 700 | ≤10 | 11.1 | 0.21 | <0.5 | 2.03 | A |
| Ex. 3 | 2.54 | 700 | ≤10 | 10 | 0.15 | <0.5 | 1.96 | A |
| Ex. 4 | 2.54 | 700 | ≤10 | 11.1 | 0.21 | <0.5 | 1.98 | A |
| Ex. 5 | 2.54 | 700 | ≤10 | 8.82 | 0.13 | <0.5 | 2.02 | A |
| Ex. 6 | 2.54 | 700 | ≤10 | 7.44 | 0.11 | <0.5 | 2.05 | A |
| Ex. 7 | 2.54 | 700 | ≤10 | 10 | 0.15 | <0.5 | 2.01 | A |
| Ex. 8 | 2.54 | 840 | ≤10 | 15.1 | 0.15 | <0.5 | 2.11 | A |
| Ex. 9 | 2.3 | 910 | ≤10 | 16.8 | 0.1 | <0.5 | 2.01 | A |
| Ex. 10 | 2.54 | 770 | ≤10 | 13.01 | 0.09 | <0.5 | 2.1 | A |
| Ex. 11 | 2.54 | 540 | ≤10 | 6.43 | 0.15 | <0.5 | 1.87 | A |
| Ex. 12 | 2.54 | 490 | ≤10 | 5.41 | 0.15 | <0.5 | 1.83 | A |
| Ex. 13 | 2.54 | 280 | ≤10 | 2.52 | 0.15 | <0.5 | 1.66 | A |

The hardcoat layers of Examples 1 to 13 had high refractive indices, and the haze values were low. The hardcoat layers of Examples 1 to 13 also had high transparency with potentially excellent optical characteristics. In Examples 1 to 13, the alkali resistance was high, preventing the hardcoat layer from being dissolved during the formation of an ITO laminated film. Specifically, it was found that the hardcoat layers of Examples 1 to 13 were high-refractive-index layers with excellent optical characteristics.

The hardcoat layers of Comparative Examples 1 to 5 had high refractive indices, but the haze values were also high. The alkali resistance was poor, and the hardcoat layer dissolved while forming the ITO laminated film. The high haze values observed in Comparative Examples 1 to 5 are believed to be due to the hardcoat layers dissolving in alkali.

The curing promoting agent and the inorganic fine particles did not dissolve in the aqueous solution in Comparative Example 6, in which the curing promoting agent was added in a large amount, and mixed simultaneously with the inorganic fine particles. It was accordingly not possible to obtain a hardcoat layer.

Example 14

In Example 14, a laminated film was produced by laminating an easily bondable layer, an optical modulation layer, and a hardcoat layer in this order on a support.
(Preparation of Aqueous Solution for Easily Bondable Layer)

An aqueous solution for easily bondable layer was prepared by mixing the following components.

Zirconia fine particle dispersion: 45.6 parts by mass (15% aqueous solution of zirconia dispersion SZR-CW, Sakai Chemical Industry Co., Ltd.)

Polyurethane: 4.2 parts by mass (Takelac WS-5100, Mitsui Chemicals)

Crosslinker: 6.3 parts by mass (10% diluted solution of Carbodilite V-02-L2, Nisshinbo Chemicals)

Surfactant A: 0.2 parts by mass (10% aqueous solution of Sandetto BL, Sanyokasei Co., Ltd.; anionic surfactant)

Surfactant B: 0.2 parts by mass (10% diluted solution of Naroacty CL-95, Sanyo Chemical Industries, Ltd.; nonionic surfactant)

Water: 43.5 parts by mass
(Preparation of Aqueous Compositions for Optical Modulation Layer and Hardcoat Layer)

Aqueous compositions for optical modulation layer and hardcoat layer were prepared by using the following compounds so as to obtain the refractive indices shown in Table 2.

Epoxy-containing alkoxysilane (3-glycidoxypropyltriethoxysilane; KBE-403, Shin-Etsu Chemical Co., Ltd.)

Tetraalkoxysilane (tetraethoxysilane; KBE-04, Shin-Etsu Chemical Co., Ltd.)

Trialkoxysilane (methyltriethoxysilane; KBE-13, Shin-Etsu Chemical Co., Ltd.)

Acetic acid aqueous solution (1% aqueous solution of industrial acetic acid, Daicel Chemical Industries, Ltd.)

Aluminum chelate complex (Aluminum Chelate D; Kawaken Fine Chemicals)

Titania dispersion (SRD-W, Sakai Chemical Industry Co., Ltd.)

The aqueous composition for optical modulation layer was prepared by using the following procedures.

The epoxy-containing alkoxysilane (45 parts by mass), and 1% acetic acid (122 parts by mass) were mixed, and sufficiently hydrolyzed. The tetraalkoxysilane (16 parts by mass) was then added to the hydrolysis solution, and the mixture was sufficiently hydrolyzed. The hydrolysis solution was separated into two equal portions, and the titania dispersion (720 parts by mass) and the aluminum chelate D (19 parts by mass) were respectively added to these portions. These were mixed, and water was added to obtain the aqueous composition for optical modulation layer having a solid content concentration of 1.2%.

The aqueous composition for hardcoat layer was prepared by using the following procedures.

The epoxy-containing alkoxysilane (33 parts by mass), and 1% acetic acid (91 parts by mass) were mixed, and sufficiently hydrolyzed. The tetraalkoxysilane (12 parts by mass) was then added to the hydrolysis solution, and the mixture was sufficiently hydrolyzed. The hydrolysis solution was separated into two equal portions, and the titania dispersion (1040 parts by mass) and the aluminum chelate D (14 parts by mass) were respectively added to these portions. These were mixed, and water was added to obtain the aqueous composition for hardcoat layer having a solid content concentration of 15%.
(Formation of Easily Bondable Layer, Optical Modulation Layer, and Hardcoat Layer)

A PET base was subjected to a corona treatment, and the aqueous solution for easily bondable layer was applied with a #4 wire bar, and dried at 150° C. for 2 minutes. After another corona treatment, the aqueous composition for optical modulation layer was applied with a #8 wire bar, and dried at 150° C. for 2 minutes. After another corona treatment, the aqueous composition for hardcoat layer was applied with a #8 wire bar, and dried at 150° C. for 2 minutes. This completed the laminated film in which the easily bondable layer, the optical modulation layer, and the hardcoat layer were laminated in this order on a support.

Examples 15 to 18

An easily bondable layer was formed in the same manner as in Example 14. An aqueous composition for optical modulation layer, and an aqueous composition for hardcoat layer were prepared so as to obtain the refractive indices shown in Table 2, and applied in the same manner as in Example 14 to produce a laminated film in which the easily bondable layer, the optical modulation layer, and the hardcoat layer were laminated in this order on a support.
(Evaluations)
(Adhesion after Exposure to Wet Heat)

The laminated film with the hardcoat layer of Example 1 laminated on the easily bondable layer on a support, and the laminated films of Examples 14 to 18 were stored in a constant temperature and humidity chamber for 250 hours under 85° C., 85% relative humidity conditions, and allowed to stand for 2 hours in a room maintained at 25° C. and 60% relative humidity. The films were each cross cut into 100 squares, and the number of squares that were not detached by a tape was counted. The results are presented in the table below.
(Alkali Resistance)

The hardcoat layers were dipped in a 5% NaOH aqueous solution at 25° C. for 5 minutes, and were measured for haze value before and after the treatment. The hardcoat layers were evaluated according to the increment of haze value, as follows.

A: Haze value increment of 0.1 or less
B: Haze value increment of more than 0.1 and 0.5 or less
C: Haze value increment of more than 0.5

(Visible Pattern Evaluation)

An ITO conductive film was deposited in 200 nm thick on the hardcoat layer using a sputtering device. The ITO conductive film was then patterned into stripes by wet etching. The sample so prepared was put on a sheet of black fabric, and visually inspected for visible patterns. Evaluations were made according to the following criteria.
A: No visible patterns
B: Patterns were slightly visible
C: Patterns were clearly visible

TABLE 2

| | Refractive index | | | | Adhesion after | |
|---|---|---|---|---|---|---|
| | Easily bondable layer | Optical modulation layer | Hardcoat layer | Alkali resistance | exposure to wet heat | Visible pattern evaluation |
| Ex. 1 | 1.83 | — | 2.01 | A | 83 | A |
| Ex. 14 | 1.66 | 1.83 | 2.01 | A | 100 | A |
| Ex. 15 | 1.66 | 1.76 | 2.01 | A | 100 | A |
| Ex. 16 | 1.66 | 1.87 | 2.01 | A | 100 | A |
| Ex. 17 | 1.66 | 1.83 | 1.91 | A | 100 | A |
| Ex. 18 | 1.66 | 1.83 | 2.05 | A | 100 | A |

It can be seen that the laminated films with the hardcoat layer of the present invention had high alkali resistance, and the adhesion remained high even after exposure to wet heat. The interlayer adhesion via the easily bondable layer was particularly high in Examples 14 to 18, in which the easily bondable layer had a refractive index close to the refractive index, 1.66, of the PET film. In Examples 14 to 18, visible patterns were not observed in the ITO conductive film deposited on the hardcoat layer, and the desirable laminated films were obtained.

The present invention can provide a low-haze aqueous composition for forming a high-refractive-index hardcoat layer. The present invention enables producing a high-refractive-index and low-haze hardcoat layer preferred for use in touch panel applications. This makes the aqueous composition of the present invention highly applicable in industry.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2014/058767, filed on Mar. 27, 2014; Japanese Patent Application No. 2013-073028 filed on Mar. 29, 2013; and Japanese Patent Application No. 2013-161702 filed on Aug. 2, 2013, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims.

What is claimed is:

1. An aqueous composition which is a mixture of an epoxy-containing alkoxysilane, an epoxy-free alkoxysilane, inorganic fine particles consisting of zirconia or titania, and a curing promoting agent,
    wherein the curing promoting agent is an aluminum chelate complex,
    the content of the curing promoting agent is 30 mass % or more with respect to the total mass of the epoxy-containing alkoxysilane and the epoxy-free alkoxysilane,
    when a metallic element derived from inorganic fine particles titania is defined as Ti, a metallic element derived from inorganic fine particles zirconia is defined as Zr, a metallic, element derived from the epoxy-containing alkoxysilane and the epoxy-free alkoxysilane is defined as Si, and a metallic element derived from a curing promoting agent aluminum chelate complex is defined as Al,
    the ratio of the number of atoms of Ti and Zr with respect to the number of atoms of Si that is (Ti+Zr)/Si is 2.5 to 18,
    the ratio of the number of atoms of Al with respect to the number of atoms of Si that is Al/Si is 0.08 to 0.22, and
    the aqueous composition has a haze value of 0.5% or less.

2. The aqueous composition according to claim 1, wherein the inorganic fine particles have a refractive index of 2.0 or more.

3. The aqueous composition according to claim 2, wherein the inorganic fine particles have an average particle size of 30 nm or less in the aqueous composition.

4. The aqueous composition according to claim 2, wherein the proportion of the epoxy-containing alkoxysilane is 20 to 85 mass % with respect to the total mass of the epoxy-containing alkoxysilane and the epoxy-free alkoxysilane.

5. The aqueous composition according to claim 2, wherein the epoxy-free alkoxysilane includes at least one of tetraalkoxysilane and trialkoxysilane.

6. The aqueous composition according to claim 2, wherein the epoxy-free alkoxysilane includes at least one of tetraethoxysilane, tetramethoxysilane, methyltriethoxysilane, and methyltrimethoxysilane.

7. A method for producing the aqueous composition according to claim 1,
    the method comprising:
    obtaining a first aqueous composition that contains the epoxy-containing alkoxysilane, the epoxy-free alkoxysilane, and the inorganic fine particles;

obtaining a second aqueous composition that contains the epoxy-containing alkoxysilane, the epoxy-free alkoxysilane, and the curing promoting agent; and mixing the first aqueous composition and the second aqueous composition.

8. The method according to claim 7, wherein the mass ratio of the first aqueous composition and the second aqueous composition is 3:7 to 9:1.

9. The method according to claim 7, wherein the inorganic fine particles have an average particle size of 30 nm or less in the aqueous composition.

10. An aqueous composition produced by using the method of claim 7.

11. A hardcoat layer formed by curing the aqueous composition of claim 1.

12. The hardcoat layer according to claim 11, wherein the hardcoat layer has a refractive index of 1.6 or more.

13. The hardcoat layer according to claim 11, wherein the hardcoat layer has a haze value of 0.5% or less.

14. A laminated film comprising the hardcoat layer of claim 11 on at least one surface of a polyester film.

15. A touch panel comprising the laminated film of claim 14, and a transparent electrode layer.

16. A laminated film comprising an easily bondable layer, an optical modulation layer, and the hardcoat layer of claim 11, in this order on a polyester film.

17. The laminated film according to claim 16, wherein the easily bondable layer and the polyester film have a
 refractive index difference of 0.03 or less, the optical modulation layer has a refractive index of 1.75 to 1.90, and the hardcoat layer has a refractive index of 1.90 to 2.10.

* * * * *